United States Patent
Fanning et al.

(10) Patent No.: US 12,142,889 B2
(45) Date of Patent: Nov. 12, 2024

(54) METHODS FOR SRS PROTECTION OF LASER COMPONENTS AND APPARATUS PROVIDING SRS PROTECTION

(71) Applicant: nLIGHT, Inc., Camas, WA (US)

(72) Inventors: C. Geoffrey Fanning, Portland, OR (US); Jay Small, Vancouver, WA (US); Dahv A. V. Kliner, Portland, OR (US); Chris A. Rivera, Vancouver, WA (US)

(73) Assignee: nLIGHT, Inc., Camas, WA (US)

( * ) Notice: Subject to any disclaimer, the term of this patent is extended or adjusted under 35 U.S.C. 154(b) by 704 days.

(21) Appl. No.: 17/419,510

(22) PCT Filed: Dec. 31, 2019

(86) PCT No.: PCT/US2019/069092
§ 371 (c)(1),
(2) Date: Jun. 29, 2021

(87) PCT Pub. No.: WO2020/142506
PCT Pub. Date: Jul. 9, 2020

(65) Prior Publication Data
US 2022/0094134 A1    Mar. 24, 2022

Related U.S. Application Data

(60) Provisional application No. 62/786,923, filed on Dec. 31, 2018.

(51) Int. Cl.
*H01S 3/30*    (2006.01)
*H01S 3/067*   (2006.01)
(Continued)

(52) U.S. Cl.
CPC ........... *H01S 3/302* (2013.01); *H01S 3/0675* (2013.01); *H01S 3/08013* (2013.01); *H01S 3/094007* (2013.01); *H01S 3/094053* (2013.01)

(58) Field of Classification Search
CPC .... H01S 3/302; H01S 3/0675; H01S 3/08013; H01S 3/094007; H01S 3/094053; H01S 3/06754; H01S 3/0078; G02B 6/29317
See application file for complete search history.

(56) References Cited

U.S. PATENT DOCUMENTS

2012/0263197 A1  10/2012  Koplow
2013/0188243 A1*  7/2013  Nicholson ............ H01S 3/0826
                                                         359/334
(Continued)

FOREIGN PATENT DOCUMENTS

WO    WO 2011/063364    5/2011

OTHER PUBLICATIONS

International Search Report and Written Opinion for related International Application No. PCT/US2019/069092, 6 pages, mailed Apr. 3, 2020.

*Primary Examiner* — Yuanda Zhang
(74) *Attorney, Agent, or Firm* — Wiley Rein LLP (57) ABSTRACT

Apparatus include a first optical fiber including a core situated to propagate a signal beam at a signal wavelength and an unwanted stimulated Raman scattering (SRS) beam at an SRS wavelength associated with the signal wavelength, and a fiber Bragg grating (FBG) situated in a core of a second optical fiber optically coupled to the core of the first optical fiber, the FBG having a selected grating reflectivity associated with the SRS wavelength and being situated to reflect the SRS beam back along the core of the second optical fiber and to reduce a damage associated with propagation of the SRS beam to power sensitive laser system components optically coupled to the second optical fiber. Methods are also disclosed.

18 Claims, 5 Drawing Sheets

(51) Int. Cl.
*H01S 3/08* (2023.01)
*H01S 3/094* (2006.01)

(56) References Cited

U.S. PATENT DOCUMENTS

2016/0111851 A1    4/2016  Kliner et al.
2016/0294153 A1   10/2016  Mornatta et al.
2021/0057873 A1*   2/2021  Sakamoto ............ H01S 3/0078

* cited by examiner

METHODS FOR SRS PROTECTION OF LASER COMPONENTS AND APPARATUS PROVIDING SRS PROTECTION

CROSS REFERENCE TO RELATED APPLICATIONS

This is the U.S. National Stage of International Application No. PCT/US2019/069092, filed Dec. 31, 2019, which was published in English under PCT Article 21(2), which in turn claims the benefit of U.S. Provisional Application No. 62/786,923, filed Dec. 31, 2018. The provisional application is incorporated herein in its entirety.

FIELD

The disclosure pertains to fiber laser systems.

BACKGROUND

Unwanted stimulated Raman scattering (SRS) in fiber lasers is a nonlinear optical effect resulting from high intensity operation, inducing an optical phonon response. The SRS power thresholds is considered one of the limiting factors for power scaling in kilo-Watt class CW fiber lasers and some pulsed fiber lasers. Most of these lasers are optimized to reduce or mitigate SRS output, however, problems associated with SRS can persist due to external seed sources such as back reflection. Therefore, a need remains to reduce undesirable effects that may come to be associated with SRS generation.

SUMMARY

According to an aspect of the disclosed technology, apparatus include a first optical fiber including a core situated to propagate a signal beam at a signal wavelength and an unwanted stimulated Raman scattering (SRS) beam at an SRS wavelength associated with the signal wavelength, and a fiber Bragg grating (FBG) situated in a core of a second optical fiber optically coupled to the core of the first optical fiber, the FBG having a selected grating reflectivity associated with the SRS wavelength and being situated to reflect the SRS beam back along the core of the second optical fiber and to reduce a damage associated with propagation of the SRS beam to power sensitive laser system components optically coupled to the second optical fiber. In some examples, the SRS beam is associated with at least one SRS event. Some embodiments further include a fused pump combiner situated to receive one or more pump beams propagating in respective pump fibers optically coupled to corresponding positions of an input end of the fused pump combiner, wherein the pump combiner is optically coupled to the first optical fiber so as to direct the one or more pump beams into the first optical fiber. Some examples further include one or more pump modules with respective pump fibers optically coupled to the fused pump combiner. Additional examples include a gain fiber situated to generate the signal beam and optically coupled to the first optical fiber, wherein the FBG is situated adjacent to an input end or an output end of the gain fiber. In some embodiments, the FBG has a grating orientation perpendicular to an optical axis of the core of the first optical fiber. In further examples, the second fiber corresponds to at least a portion of a gain fiber situated to generate the signal beam. In some examples, the second fiber comprises a length of passive fiber that includes an oscillator FBG situated in the core of the passive fiber that is highly reflective at the signal wavelength associated with an oscillator optically coupled to or part of the second fiber. In selected examples, the second fiber comprises a length of passive fiber that includes an oscillator FBG situated in the core that is partially reflective at a laser wavelength associated with an oscillator optically coupled to or part of the second fiber. Some embodiments further include a gain fiber optically coupled to the second optical fiber and wherein the second optical fiber comprises a length of optical fiber optically coupled to an output of the gain fiber and an end of the first optical fiber. In particular examples, the second optical fiber comprises a length of optical fiber that is situated between (i) a high reflector of a laser oscillator situated to generate and direct an output beam away from the second optical fiber and (ii) an optical power sensitive component that is optically coupled to a core of the laser oscillator so as to co-propagate with the output beam. Some embodiments further include a fused fiber combiner optically coupled between the high reflector and the optical power sensitive component. In some examples, the FBG is situated between the fused fiber combiner and the laser oscillator and/or between the fused fiber combiner and the optical power sensitive component. In some embodiments, the first optical fiber and the second optical fiber comprise a continuous length of optical fiber. For some embodiments, the SRS beam has a wavelength corresponding to the SRS wavelength of an associated output beam having an average output power of 1 kW or greater.

According to another aspect of the disclosed technology, methods include producing with a fiber laser oscillator a laser beam that propagates in a first direction, and reflecting an stimulated Raman scattering (SRS) beam propagating in a second direction opposite the first direction along a core of an optical fiber of the fiber laser oscillator so that the SRS beam propagates back along the core of the optical fiber and away from power sensitive laser system components, with an SRS fiber Bragg grating (FBG) situated to reduce damage associated with receiving of the SRS beam by the power sensitive laser system components. In some examples, the power sensitive laser system components include at least one of a fused fiber combiner or a pump module.

According to a further aspect of the disclosed technology, methods include situating in a fiber laser system configured to produce a signal beam at a signal wavelength a fiber Bragg grating (FBG) configured to be reflective at a stimulated Raman scattering (SRS) wavelength of the signal wavelength so that an SRS beam that propagates in a fiber core of the fiber laser system is reflected so as to propagate back along the fiber core and away from power sensitive laser system components of the fiber laser system so as to reduce a damage associated with receiving of the SRS beam by the power sensitive laser system components. In some examples, the power sensitive laser system components include one or more of a fused fiber combiner or one or more pump modules.

The foregoing and other objects, features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the terms "coupled" or "optically coupled" do not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatuses are referred to as "lowest," "best," "minimum," or the like. It will be appreciated that such descriptions are intended to indicate that a selection among many used functional alternatives can be made, and such selections need not be better, smaller, or otherwise preferable to other selections.

As used herein, optical radiation refers to electromagnetic radiation at wavelengths of between about 100 nm and 10 μm, and typically between about 500 nm and 2 μm. Examples based on available laser diode sources and optical fibers generally are associated with wavelengths of between about 800 nm and 1700 nm. In representative examples, pump sources generate pump beams between 800 nm and 1000 nm, such as at 808 nm, 815 nm, and 976 nm (with various bandwidths), and active fibers generate beams in the range of 1000 nm to 1100 nm, such as 1030 nm, 1050 nm, 1064 nm, etc., and with various bandwidths. In some examples, propagating optical radiation is referred to as one or more beams having diameters, asymmetric fast and slow axes, beam cross-sectional areas, and beam divergences that can depend on beam wavelength and the optical systems used for beam shaping. For convenience, optical radiation is referred to as light in some examples, and need not be at visible wavelengths.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam.

The term brightness is used herein to refer to optical beam power per unit area per solid angle. In some examples, optical beam power is provided with one or more laser diodes that produce beams whose solid angles are proportional to beam wavelength and inversely proportional to beam area. Selection of beam area and beam solid angle can produce pump beams that couple selected pump beam powers into one or more core or cladding layers of double, or other single or multi-clad optical fibers. Beam cross-sectional areas, diameters, or other beam dimensions can be described using boundaries that generally correspond to a zero intensity value, a 1/e value, a $1/e^2$ value, a full-width half-maximum (FWHM) value, or other suitable metric.

Figure 1:
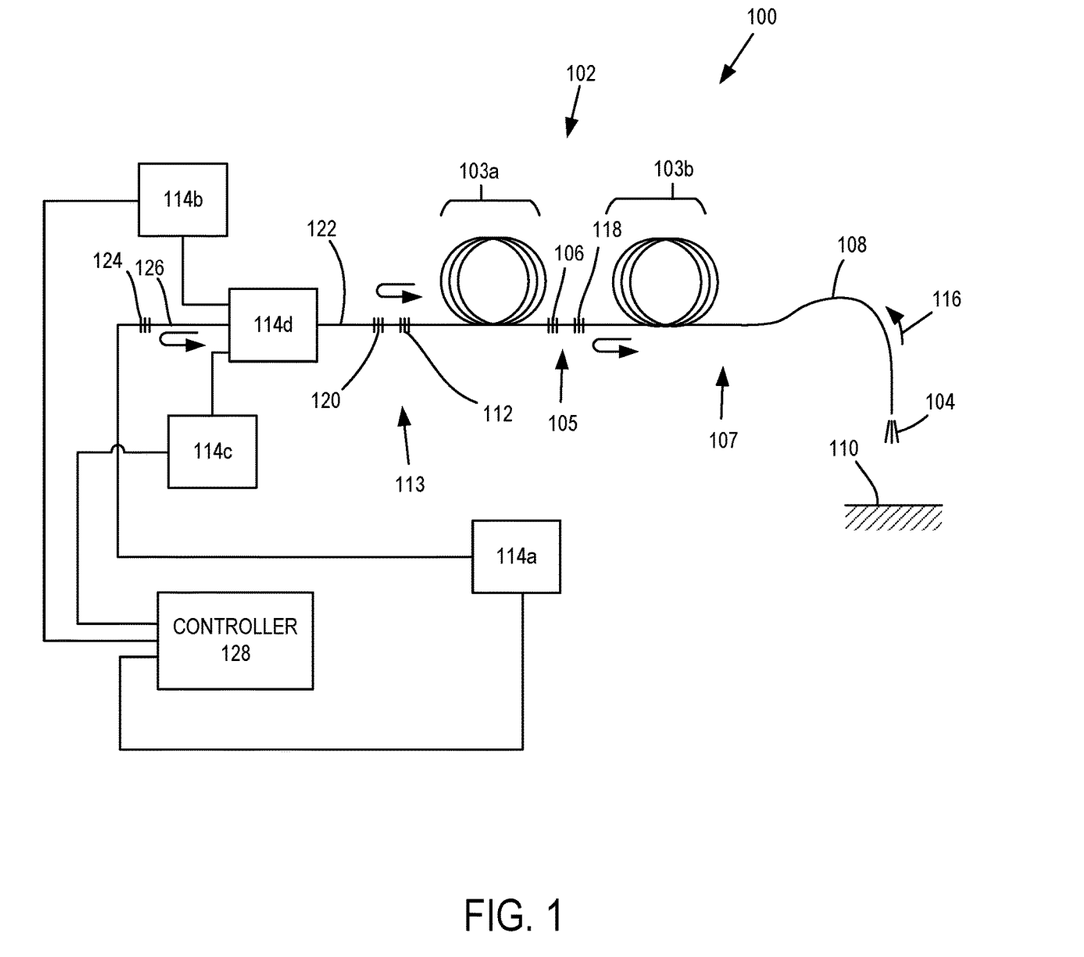
FIG. 1 shows a schematic of a laser system.

FIG. 1 shows a fiber laser system 100 that includes a gain fiber 102 that can be situated in a fiber oscillator, with a gain fiber section 103a, and/or may include a fiber amplifier, with gain fiber section 103b, to generate an output beam 104. In typical examples, the output beam 104 propagates in a single transverse mode with a high average power, such as 0.6 kW, 0.8 kW, 1 kW, 1.2 kW, 1.4 kW, 1.5 kW, 2 kW, 2.5 kW, 3 kW, 4 kW, 5 kW or greater. Beam qualities at an output coupler end of the fiber laser oscillator 102 can have $M^2$ values at or lower than 1.5, 1.4, 1.2, 1.1, 1.02 or 1.01, or $M^2$ may be equal to 1.0. Further increases in average power can be achieved through provision of additional pump power and/or inclusion of additional optical amplification stages. The beam quality of the output beam 104 may be diffraction-limited (single transverse mode, $M^2$ near 1.0), or it may be multimode with $M^2$ greater than 1.0, with values up to 1.5, 2, 3, 5, 10, 15, or greater. However, further amplification within the gain fiber 102 is associated with an onset or increase of non-linear optical effects associated with the high intensity of the output beam 104 propagating in a core of the gain fiber 102, the small effective mode area associated with the core, and the interaction length of the beam with the core of the gain fiber 102 along which laser gain is generated. The output beam 104 is typically generated in a core of the gain fiber 102, such as the gain fiber sections 103a, 103b. Various fiber sections/lengths herein can be coupled with fused-fiber splices.

In fiber oscillator examples, a fiber Bragg grating (FBG) 106 that is partially reflective at a wavelength associated with the output beam 104 is situated in a core of the gain fiber section 103a or in a core of a passive fiber optically coupled to the gain fiber 102 at an output end 105 of the gain fiber section 103a. In typical examples, reflectivities for the FBG 106 are selected to be at or greater than 0.1%, 2%, 5%, 10%, 20%, 25%, 50%, 80%, 95%, or greater. The output beam 104 is coupled from the gain fiber 102 into a delivery fiber 108 and is directed to a target 110 or to other laser system components. A means of light and/or heat transfer 115 can be optically coupled to the delivery fiber 108 and situated to remove unwanted light propagating in the cladding of the delivery fiber 108. The delivery fiber 108 delivers the laser beam to the target 110 or other laser components.

Another FBG 112 that is highly reflective at the wavelength associated with the output beam 104 is situated in a core of the gain fiber 102 or in a passive fiber optically coupled to the gain fiber 102 at an end 113 of the gain fiber 102. In typical examples, reflectivities for the FBG 112 are selected to be at or greater than 90%, 95%, 98%, 99%, 99.9%, 99.99%, 99.999%, or greater. The opposing FBGs 106, 112 can be situated so as to define the fiber oscillator. One or more power sensitive components 114a-114d (such as a fused fiber combiner, pump modules, optical detector, seed source, etc.) are optically coupled (directly or indirectly) to the fiber laser system 100. One or more optical power sensitive components, such as fused fiber combiners, pump modules, etc., can also be coupled to the gain fiber 102 between the FBGs 106, 112 or between the FBG 106 and the output end of the delivery fiber 108 (e.g., in a counter-pumping arrangement), including at a location 107 between the gain fiber section 130b and the delivery fiber 108.

The substantial optical powers and power densities generated by the fiber laser system 100 can be associated with failure of the fiber laser system 100. Back-reflection of the output beam 104 from target 110 or other high-power illumination can be coupled into the delivery fiber 108 generating an SRS beam 116 that may transmit to the gain fiber 102 and laser system components 114a-114d. The SRS beam 116 typically has a wavelength associated with a Raman spectrum of the optical fibers of the fiber laser system 100, including one or more Stokes or anti-Stokes wavelength peaks or bands. SRS gain increases depending on the effective propagation length of fiber. Also, degradation of optical fiber components, such as the delivery fiber 108 is associated with the formation or propagation of the SRS beam 116. The SRS beam 116 can become amplified to high powers and can propagate past FBGs 106, 112, which are typically transmissive at a wavelength of the SRS beam 116. Thus, in some examples, an SRS FBG 118 is situated in a core of the gain fiber 102 or adjacent delivery fiber 108 proximate the output end 105 of the gain fiber 102 (e.g., proximate location 107). The SRS FBG 118 is situated to reflect the SRS beam 116 so that the SRS beam 116 propagates back through the delivery fiber 108 and does not damage the laser system components 114a-114d. In further examples, an SRS FBG 120 can be situated in a core of the gain fiber 102 or adjacent to in-line optical fiber 122 proximate the end 113 of the gain fiber. The SRS FBG 120 is also situated to reflect the SRS beam 116 or another SRS beam that is generated in the core of the gain fiber 102 and propagating back through the fiber gain fiber 102 so as to protect the laser system components 114a-114d. Additional examples can include an SRS FBG 124 situated in a core of an optical fiber 126 that couples one or more laser system components, such as laser system components 114a and 114d. The SRS beam 116 or another SRS beam that propagates back through the core of the gain fiber 102 and laser system component 114d is reflected by the SRS FBG 124 to propagate back through the core of the optical fiber 126 and gain fiber 102. A means of light and/or heat transfer 129 can be optically coupled to fiber 126 and situated to remove cladding light propagating in fiber 126 so as to remove SRS beam 116. In some examples, a combination of the SRS FBGs 118, 120, 124 are present in the fiber laser system 100. In different examples, the SRS FBG position can be swapped with or moved in relation to an adjacent FBG position. Also, the SRS FBG 118 can be situated in the delivery fiber 108 or another optical fiber between the FBG 106 and the output of the fiber laser system 100. In some examples, the SRS FBG 118 and/or SRS FBG 120 can be co-written in the same core length as the FBG 106. In some examples, SRS FBGs and/or HR or PR FBGs can be situated in passive fiber lengths spliced to the fiber laser system 100. Reflectivities for the SRS FBG 118, and/or SRS FBG 120, 124 can be selected to relatively high, such as 95%, 98%, 99%, 99.9%, 99.99%, 99.999%, or greater, though other reflectivities can be selected, such as at or greater than 0.1%, 2%, 5%, 10%, 20%, 25%, 50%, 80%, or greater. The laser system controller 128 is coupled to the pump sources (or associated power sources or laser drivers) to control the timing and characteristics (power, modulation, etc.) of the pump beams generated by the pump sources and the timing and characteristics of the output beam 104 that is generated based on the timing and characteristics of the delivered pump beams.

As discussed above, in examples herein, to reduce the damage to laser system components associated with the SRS beam 116, failure of the delivery fiber 108, or other SRS events, an FBG is selectively positioned in a core of the fiber laser system 100 that has a reflectivity associated with one or more SRS wavelengths. The FBG is typically situated to reflect back along the region in which the incident beam is guided, such as through the core or inner cladding, to reduce the likelihood of a catastrophic failure that can result from a directing of the SRS beam 116 out of the fiber proximate the FBG. In some examples, the FBG 118 is situated in a fiber core, e.g., adjacent to the FBG 106, so as to reflect the SRS beam 116 back along the fiber core. The FBG 120 can also be situated in a fiber core, e.g., adjacent to the FBG 112, so as to reflect the SRS beam 116 back along the fiber cores of the gain fiber 102. The FBG 120 also can be situated in a fiber core closer to the output of the fused fiber combiner, so as to reflect the SRS beam 116 back along the cores of the fiber laser system 100. In another example, the FBG 124 is situated in the core of the optical fiber 126, so as to reflect the SRS beam 116 back through fused fiber combiner and through the gain fiber 102.

Figure 3:
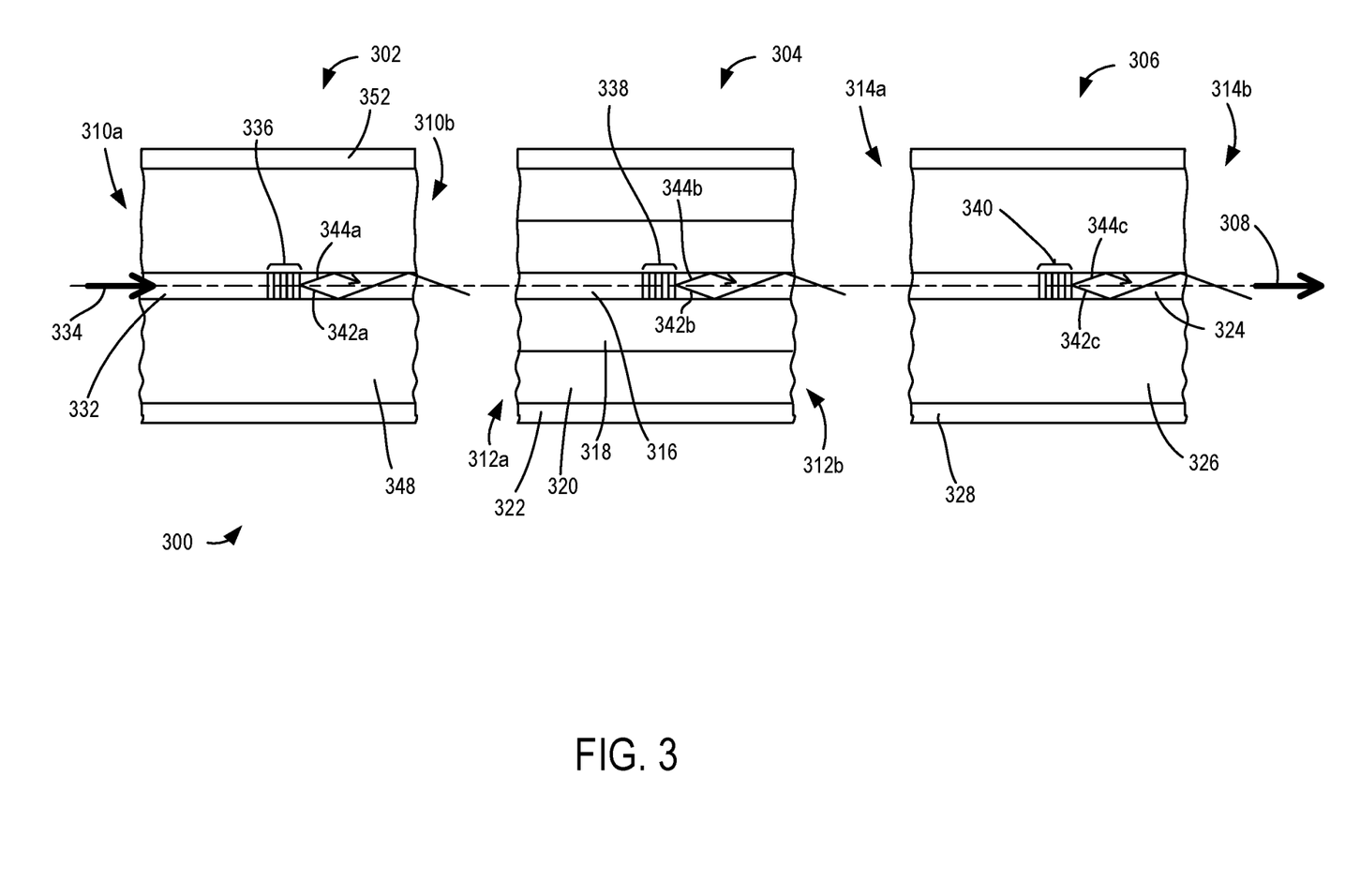
FIG. 3 is a cross-sectional schematic of various laser system embodiments.

FIG. 3 shows a cross-sectional schematic of optical fiber portions 302, 304, 306 of a fiber laser system 300 situated to emit a single-mode output beam 308. The optical fiber portions 302, 304, 306 include respective opposite ends, 310a, 310b, 312a, 312b, 314a, 314b and are optically coupled in series, e.g., through fusion splices or free-space coupling, in the production of the single-mode output beam 308.

The optical fiber portion 304 can correspond to a portion of a fiber laser oscillator and can include a core 316 with at least a portion that is situated to propagate optical flux of the single-mode output beam 308. The core 316 is typically single-mode or few-mode. An inner cladding 318 surrounds the core 316 and an outer cladding 320 surrounds the inner cladding 318. A polymer layer 322 surrounds outer cladding 320 and additional layers (not shown) can also surround the polymer layer 322. The inner and outer claddings 318, 320 are typically made of glass or other suitable optical guiding material. In representative examples, a substantial amount of a total pump light power is guided by the inner cladding 318; the outer cladding 320 provides a barrier to prevent damage to polymer layer 322 caused by the pump light power. An amount of the total pump light power is guided by the outer cladding 320 and the amount is selected to prevent damage to optical fiber portion 304. Fiber portion 304 may have an active or passive core 316. In an example where optical fiber portion 304 is part of a passive length of optical fiber, another portion of the fiber may comprise active fiber. In passive length examples, the optical fiber portion 304 can include an FBG operable to reflect light at the wavelength of the single-mode output beam so as to define a fiber laser oscillator high reflector or a fiber laser oscillator partial reflector or output coupler. In additional passive length examples, the optical fiber portion 304 can be optically coupled through the end 312b to an input of a pump combiner situated to combine and co-propagate pump light in the direction of the single-mode output beam 308. The optical fiber portion 304 can also be coupled through the end 312a to an output of the co-propagating pump combiner. The optical fiber portion 304 can also correspond to a passive length coupled through the end 312a to an input of a counter-propagating pump combiner or through the end 312b to an output of the counter-propagating pump combiner. Pump combiners can also be coupled to portions of active lengths of the fiber laser oscillator or amplifier stages.

The optical fiber portion 306 can correspond to a portion of an optical fiber optically coupled to a fiber laser oscillator, such as a passive length of fiber that includes an FBG defining a partial reflecting output coupler of the fiber laser oscillator. The optical fiber portion 306 can also correspond to a delivery fiber in some examples. In representative examples, the optical fiber portion 306 includes a core 324 situated to propagate the single-mode output beam 308 received from an output of the fiber laser oscillator. A cladding 326 adjacent to the core 324 typically extends to a buffer layer 328.

The optical fiber portion 302 can correspond to a passive length of fiber that is optically coupled to a pump combiner input at the end 310a or a pump combiner output at the 310b or to a length of fiber optically coupled to one of the ends 310a, 310b. In some examples, the optical fiber portion 302 can correspond to a portion of a delivery fiber (such as from a pump source or other optical power sensitive component) that is optically coupled through the end 310b to an input of the pump combiner or other fiber lengths that are optically coupled to a fiber laser oscillator. In representative examples, the optical fiber portion 302 includes a core 332 situated to receive and propagate a beam 334 generated with the pump source or other optical power sensitive component. The beam 334 is optically coupled into the optical fiber portion 302 so as to be guided by the core 332.

One or more FBGs 336, 338, 340 can be located in one or more of the respective optical fiber portions 302, 304, 306 with high reflectivity at an SRS wavelength associated with the single-mode output beam and high transmissivity at a signal wavelength of the single-mode output beam. The FBGs 336, 338, 340 are situated to reflect SRS beam portions 342a, 342b, 342c that can propagate along the respective cores 332, 316, 324 in the opposite direction of the single-mode output beam 308 so that reflected SRS beam portions 344a, 344b, 344c propagate back along the respective cores 332, 316, 324. One or more of the FBGs 336, 338, 340 can be selectively positioned based on the optical fiber characteristics of the fiber laser system 300 to reflect one or more of the SRS beam portions 342a, 342b, 342c so as to maintain high power laser operation, avoid the generation of SRS gain during normal high power operation, and reduce the effects of an abnormal event on the integrity of the fiber laser system 300. In some examples, only one of the FBGs 336, 338, 340 that is reflective at the SRS wavelength is used so as to avoid creation of an SRS oscillator in the fiber laser system 300. In further examples, systems can produce high power signal beams during normal operation with no SRS beam, or an SRS beam at a sufficiently low optical power that the SRS beam does not amplify or damage components.

In an example, the fiber portion 304 may be directly optically coupled to a fiber laser oscillator length of the fiber laser system 300 and FBG 338 may be situated adjacent to or co-written with a partial reflecting output coupler FBG of the fiber laser oscillator. The single-mode output beam 308 in the fiber laser oscillator typically has a peak power at the position of the partial reflecting output coupler. The FBG 338 can reflect the SRS beam portion 342b so that the reflected SRS beam portion 344b propagates back through the core 316 to the output of the fiber laser system 300, and avoids further propagation through the fiber laser oscillator or sensitive downstream components of the fiber laser system 300. In some system architectures and output powers, positioning of the FBG 338 in proximity to the output coupler of the fiber laser oscillator can be associated with undesirable effects. In such situations, the FBG 338 can have a non-zero reflectivity at the signal wavelength and can produce a corresponding reflection or scattering at the signal wavelength, which can degrade the characteristics of the single-mode output beam 308. During laser operation or during abnormal events such as fiber failures, the FBG 338 can be associated with significant heating that can alter the reflectivity band of the FBG 338 and can affect the local laser packaging configuration. For example, optical fiber portion 304 with the FBG 338 can be positioned adjacent to an existing or additional cooling system component.

In another example, the optical fiber portion 304 can correspond to an active or passive optical fiber length that is directly optically coupled (e.g., through a fusion splice) to a fiber laser oscillator length. FBG 338 may be situated adjacent to or co-written with a high reflector FBG of the fiber laser oscillator that is highly reflective at the wavelength of the single-mode output beam 308. During laser operation, the core 316 at or near the position of the high reflector typically receives an optical intensity that is lower than at the partial reflector. Positioning the FBG 338 proximate the high reflector can reduce scattering or reflection at the wavelength of the single-mode output beam 308 without significantly increasing components. In examples without an additional FBG upstream of the FBG 338 proximate the high reflector, the SRS beam portion 342b can propagate in the length of delivery fibers, amplifier fibers, and the length of the fiber laser oscillator before reflection at the FBG 338. The additional interaction length can correspond to an increased SRS gain for the SRS beam portion 342b and can also correspond to the formation of an SRS oscillator between the FBG 338 and a partial reflecting output coupler of the fiber laser oscillator which can have non-zero reflectivity at the SRS wavelength.

In a further example, the optical fiber portion 304 can correspond to a passive optical fiber length that is optically coupled to a fiber laser oscillator length through the end 312b and to a pump combiner output through the end 312a. In representative examples, an existing length of passive fiber can be additionally processed with the writing of the FBG 338 or an additional length of passive fiber in which the FBG 338 is written can be spliced to the existing length of passive fiber. With the FBG 338 spaced apart from the fiber laser oscillator and upstream of any active regions, the FBG 338 can avoid interaction with the generation of the single-mode output beam 308.

In some examples, the SRS beam portions 342a-342c can approach substantial powers (e.g., exceeding 1 W, 10 W, 50 W, 100 W, 500 W, or more) during abnormal operational events of the fiber laser system 300.

Figure 4A:
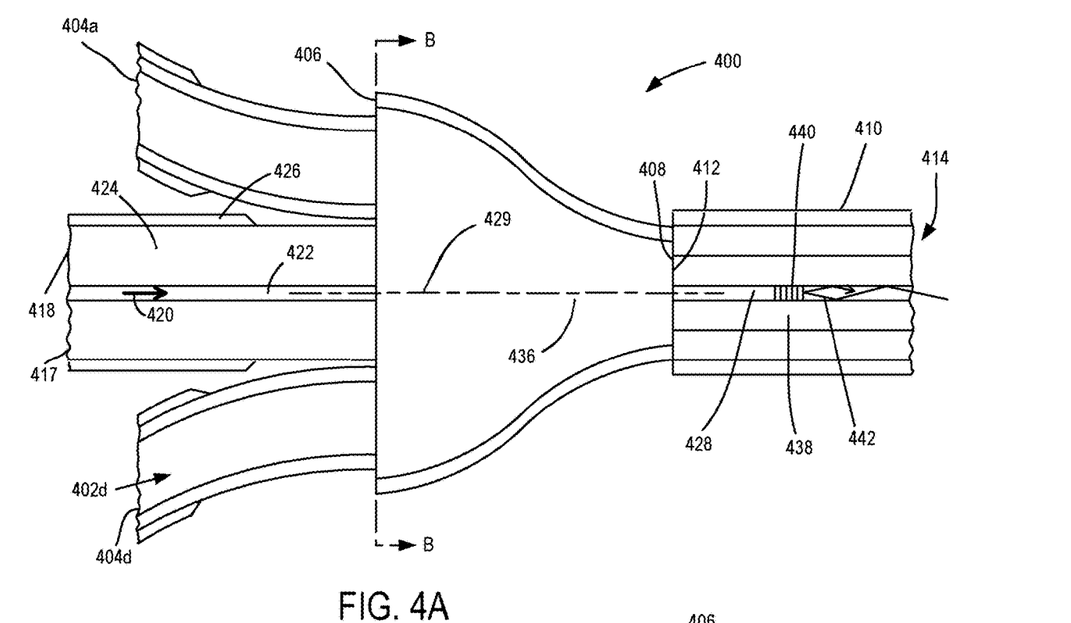
FIGS. 4A-4B show cross-sectional views of a pump combiner.
Figure 4B:
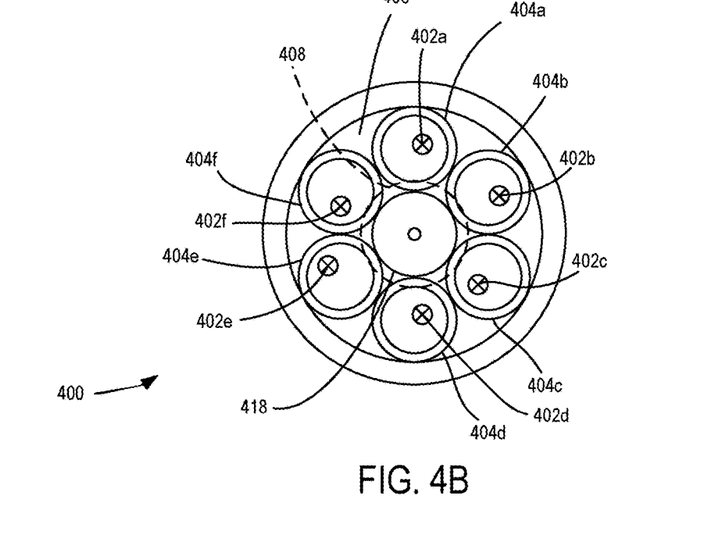

FIGS. 4A-4B illustrates an example of a fused fiber pump combiner 400 suitable for coupling a plurality of pump beams 402*a*-402*f* propagating in respective pump fibers 404*a*-404*f* at a pump combiner input end 406 to an input end 408 of a passive fiber 410 at a pump combiner output end 412. A fiber laser oscillator can be optically coupled to an opposite end 414 of the passive fiber 410 so as to receive the pump beams 402*a*-402*f* and produce a high power single-mode output beam with an average power of 800 W, 1 kW, 1.2 kW, 1.5 kW, 1.8 kW, or greater.

A portion 417 of a central delivery fiber 418 is optically coupled to a center position of the input end 406 of the pump combiner 400. A beam 420 is optically coupled to a core 422 of the portion 417, and a cladding 424 adjacent to the core extends to a buffer layer 426. In typical examples, the core 422 and a core 428 of the passive fiber 410 are aligned to a common optical axis 429. In some examples, the central delivery fiber 418 includes a length of passive fiber that can have the same or different cross-sectional configuration as the passive fiber 410 spliced between the portion 417 and the center position of the input end 406 of the pump combiner 400. In representative examples, the central delivery fiber 418 is a double-clad or single-clad fiber. In some embodiments, the passive fiber 410 includes an FBG 440 situated in the core 428 so that an incident SRS beam portion 442 is reflected back along the core 428. In some examples, the central delivery fiber 418 is a pump fiber and the beam 420 is a pump beam. In other examples, the central delivery fiber is coupled to one or more other optical power sensitive components.

Figure 5:
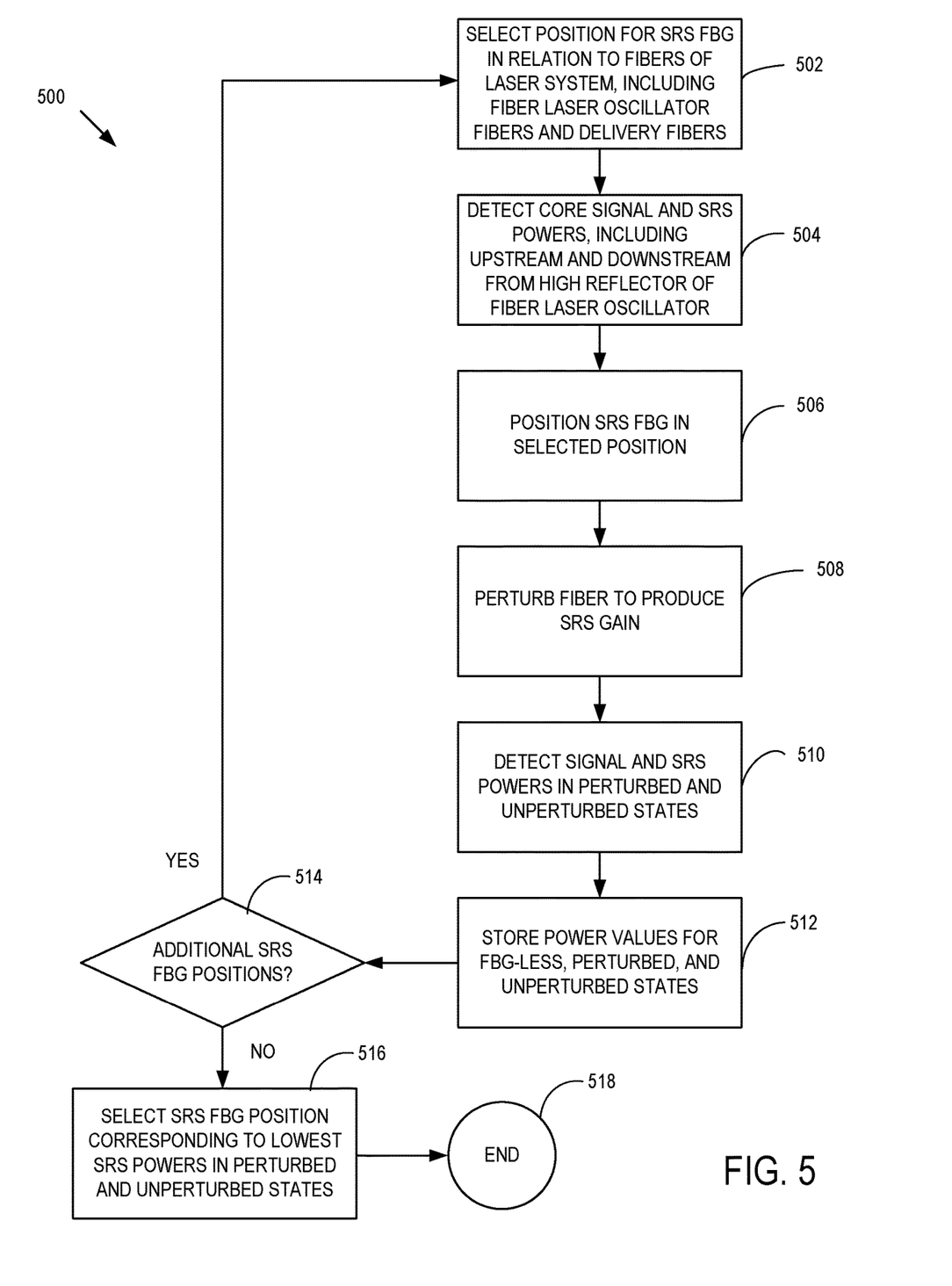
FIG. 5 is a flowchart of an SRS FBG selection method.

FIG. 5 depicts a method 500 for configuring a fiber laser system with an FBG that is reflective at an SRS wavelength. At 502, a position in a core of a fiber of the fiber laser system is selected for placement of an FBG that is highly reflective at an SRS wavelength and highly transmissive at a wavelength of the single-mode output beam. For example, the SRS FBG can be positioned in the active core of the fiber laser oscillator, an active core of a subsequent amplifier gain stage, a core of a fiber length that includes a highly reflective FBG forming an HR of the oscillator (e.g., adjacent, co-written), a core of a fiber length that includes a partially reflective FBG forming a PR of the oscillator, a passive length of fiber coupled to an output of a pump combiner, etc. Additionally, the position can be selected based on proximity to existing heat removing elements, such as heat sinks.

The single-mode output beam is generated in a core of the fiber laser oscillator based on pump light optically coupled to the fiber laser oscillator through a fused pump combiner. At 504, a power level of the single-mode output beam that propagates in the core and is output from the fiber laser oscillator is detected, and a power level of an SRS beam that propagates in the same core is also detected, both at an output of the fiber laser oscillator and upstream from the highly reflective HR FBG where very little power of the single-mode output beam typically exists. At 506, the SRS FBG is placed in the position selected at 502, e.g., by fusion splicing a short length of similar fiber that includes the SRS FBG, by replacing an existing fiber length with a similar length that includes the SRS FBG, or by writing the SRS FBG to an existing length. During active generation of the single-mode output beam, typically operating at or near a peak power level, the fiber laser system is perturbed, at 508, so as to produce an SRS event. For example, protective elements associated redirecting back-reflection by a laser processing can be removed and the single-mode output beam can be directed back into the fiber laser system. One or more filters can be used to select a power level that is back-coupled into the fiber laser system. In another example, a selected position of a delivery fiber or other fiber length is bent or broken. At 510, the power levels of the single-mode output beam and the core propagating SRS light are detected, both in the unperturbed and perturbed states, and at 512, data and values associated with the various detected powers are stored for comparison and analysis. At 514, if additional SRS FBG positions are to be selected for comparison, a new position is selected at 502. If sufficient data associated with various SRS FBG positions has been obtained, at 516, the SRS FBG position with the most robust fiber laser system response can be selected.

Figure 2:
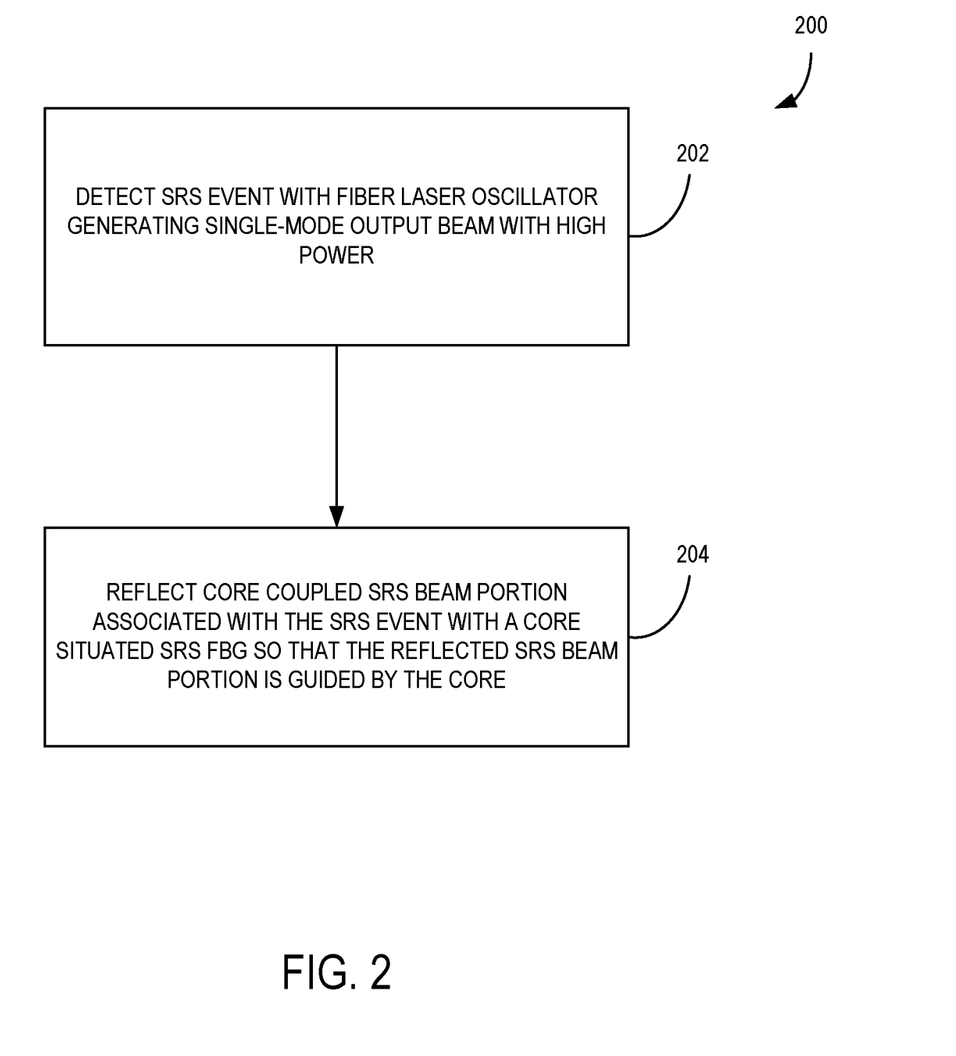
FIG. 2 is a flowchart of a method of SRS mitigation.

FIG. 2 shows a method of protecting a fiber laser system during an SRS event. At 202, an SRS event is detected in a fiber laser oscillator that is generating a single-mode output beam with a high average power (e.g., 1 kW or greater). SRS events can correspond to substantial back-reflections of the single-mode output beam through a delivery fiber or other fiber lengths so as to generate SRS gain. At 204, an FBG having a substantial reflectivity at an SRS wavelength associated with the single-mode output beam reflects a core-coupled SRS beam portion associated with the SRS event so that the reflected SRS beam portion is guided by the core. In some examples, the reflected SRS beam portion increases in power after reflection. The reflection of the SRS beam portion can protect sensitive internal components such as pump sources that could become damaged by the SRS beam portion.

Additional Embodiments

Additional embodiments include those described in the following numbered paragraphs:

1. An apparatus, comprising: a first optical fiber including a core situated to propagate a signal beam at a signal wavelength and an unwanted stimulated Raman scattering (SRS) beam at an SRS wavelength associated with the signal wavelength; and a fiber Bragg grating (FBG) situated in a core of a second optical fiber optically coupled to the core of the first optical fiber, the FBG having a selected grating reflectivity associated with the SRS wavelength and being situated to reflect the SRS beam back along the core of the second optical fiber and to reduce a damage associated with propagation of the SRS beam to power sensitive laser system components optically coupled to the second optical fiber.

2. The apparatus of any of the preceding paragraphs, wherein the SRS beam is associated with at least one SRS event.

3. The apparatus of any of the preceding paragraphs, further comprising a fused pump combiner situated to receive one or more pump beams propagating in respective pump fibers optically coupled to corresponding positions of an input end of the fused pump combiner, wherein the pump combiner is optically coupled to the first optical fiber so as to direct the one or more pump beams into the first optical fiber.

4. The apparatus of paragraph 3, further comprising one or more pump modules with respective pump fibers optically coupled to the fused pump combiner.

5. The apparatus of any of the preceding paragraphs, further comprising a gain fiber situated to generate the signal beam and optically coupled to the first optical fiber, wherein the FBG is situated adjacent to an input end or an output end of the gain fiber.

6. The apparatus of any of the preceding paragraphs, wherein the FBG has a grating orientation perpendicular to an optical axis of the core of the first optical fiber.

7. The apparatus of any of the preceding paragraphs, wherein the second fiber corresponds to at least a portion of a gain fiber situated to generate the signal beam.

8. The apparatus of any of the preceding paragraphs, wherein the second fiber comprises a length of passive fiber that includes an oscillator FBG situated in the core of the passive fiber that is highly reflective at the signal wavelength associated with an oscillator optically coupled to or part of the second fiber.

9. The apparatus of any of the preceding paragraphs, wherein the second fiber comprises a length of passive fiber that includes an oscillator FBG situated in the core that is partially reflective at a laser wavelength associated with an oscillator optically coupled to or part of the second fiber.

10. The apparatus of any of the preceding paragraphs, further comprising a gain fiber optically coupled to the second optical fiber and wherein the second optical fiber comprises a length of optical fiber optically coupled to an output of the gain fiber and an end of the first optical fiber.

11. The apparatus of any of the preceding paragraphs, wherein the second optical fiber comprises a length of optical fiber that is situated between (i) a high reflector of a laser oscillator situated to generate and direct an output beam away from the second optical fiber and (ii) an optical power sensitive component that is optically coupled to a core of the laser oscillator so as to co-propagate with the output beam.

12. The apparatus of paragraph 11, further comprising a fused fiber combiner optically coupled between the high reflector and the optical power sensitive component.

13. The apparatus of paragraph 12, wherein the FBG is situated between the fused fiber combiner and the laser oscillator and/or between the fused fiber combiner and the optical power sensitive component.

14. The apparatus of any of the preceding paragraphs, wherein the first optical fiber and the second optical fiber comprise a continuous length of optical fiber.

15. The apparatus of any of the preceding paragraphs, wherein the SRS beam has a wavelength corresponding to the SRS wavelength of an associated output beam having an average output power of 1 kW or greater.

16. A method, comprising: producing with a fiber laser oscillator a laser beam that propagates in a first direction; and reflecting an stimulated Raman scattering (SRS) beam propagating in a second direction opposite the first direction along a core of an optical fiber of the fiber laser oscillator so that the SRS beam propagates back along the core of the optical fiber and away from power sensitive laser system components, with an SRS fiber Bragg grating (FBG) situated to reduce damage associated with receiving of the SRS beam by the power sensitive laser system components.

17. The method of paragraph 16, wherein the power sensitive laser system components include at least one of a fused fiber combiner or a pump module.

18. A method, comprising: situating in a fiber laser system configured to produce a signal beam at a signal wavelength a fiber Bragg grating (FBG) configured to be reflective at a stimulated Raman scattering (SRS) wavelength of the signal wavelength so that an SRS beam that propagates in a fiber core of the fiber laser system is reflected so as to propagate back along the fiber core and away from power sensitive laser system components of the fiber laser system so as to reduce a damage associated with receiving of the SRS beam by the power sensitive laser system components.

19. The method of paragraph 18, wherein the power sensitive laser system components include one or more of a fused fiber combiner or one or more pump modules.

Having described and illustrated the principles of the disclosed technology with reference to the illustrated embodiments, it will be recognized that the illustrated embodiments can be modified in arrangement and detail without departing from such principles. We therefore claim all that comes within the scope of these claims.

We claim:

1. An apparatus, comprising:
   a first optical fiber including a core situated to propagate a signal beam at a signal wavelength and an unwanted stimulated Raman scattering (SRS) beam at an SRS wavelength associated with the signal wavelength; and
   a fiber Bragg grating (FBG) situated in a core of a second optical fiber optically coupled to the core of the first optical fiber, the FBG having a selected grating reflectivity associated with the SRS wavelength and being situated to reflect the SRS beam back along the core of the second optical fiber and to reduce a damage associated with propagation of the SRS beam to power sensitive laser system components optically coupled to the second optical fiber,
   wherein the second optical fiber comprises a length of optical fiber that is situated between (i) a high reflector of a laser oscillator situated to generate and direct an output beam away from the second optical fiber and (ii) an optical power sensitive component that is optically coupled to a core of the laser oscillator so as to copropagate with the output beam.

2. The apparatus of claim 1, wherein the SRS beam is associated with at least one SRS event.

3. The apparatus of claim 1, further comprising a fused pump combiner situated to receive one or more pump beams propagating in respective pump fibers optically coupled to corresponding positions of an input end of the fused pump combiner, wherein the pump combiner is optically coupled to the first optical fiber so as to direct the one or more pump beams into the first optical fiber.

4. The apparatus of claim 3, further comprising one or more pump modules with respective pump fibers optically coupled to the fused pump combiner.

5. The apparatus of claim 1, further comprising a gain fiber situated to generate the signal beam and optically coupled to the first optical fiber, wherein the FBG is situated adjacent to an input end or an output end of the gain fiber.

6. The apparatus of claim 1, wherein the FBG has a grating orientation perpendicular to an optical axis of the core of the first optical fiber.

7. The apparatus of claim 1, wherein the second optical fiber corresponds to at least a portion of a gain fiber situated to generate the signal beam.

8. The apparatus of claim 1, wherein the second optical fiber comprises a length of passive fiber that includes an oscillator FBG situated in the core of the passive fiber that is highly reflective at the signal wavelength associated with an oscillator optically coupled to or part of the second fiber.

9. The apparatus of claim 1, wherein the second optical fiber comprises a length of passive fiber that includes an oscillator FBG situated in the core that is partially reflective at a laser wavelength associated with an oscillator optically coupled to or part of the second fiber.

10. The apparatus of claim 1, further comprising a gain fiber optically coupled to the second optical fiber and wherein the second optical fiber comprises a length of optical fiber optically coupled to an output of the gain fiber and an end of the first optical fiber.

11. The apparatus of claim 1, further comprising a fused fiber combiner optically coupled between the high reflector and the optical power sensitive component.

12. The apparatus of claim 11, wherein the FBG is situated between the fused fiber combiner and the laser oscillator and/or between the fused fiber combiner and the optical power sensitive component.

13. The apparatus of claim 1, wherein the first optical fiber and the second optical fiber comprise a continuous length of optical fiber.

14. The apparatus of claim 1, wherein the SRS beam has a wavelength corresponding to the SRS wavelength of an associated output beam having an average output power of 1 kW or greater.

15. A method, comprising:
producing with a fiber laser oscillator a laser beam that propagates in a first direction through an optical fiber having a core, the optical fiber comprising a first optical fiber coupled to a second optical fiber to produce an output beam; and
reflecting an stimulated Raman scattering (SRS) beam propagating in a second direction opposite the first direction along the core of the optical fiber of the fiber laser oscillator so that the SRS beam propagates back along the core of the optical fiber and away from power sensitive laser system components, with an SRS fiber Bragg grating (FBG) situated to reduce damage associated with receiving of the SRS beam by the power sensitive laser system components,
wherein the second optical fiber comprises a length of optical fiber that is situated between (i) a high reflector of the fiber laser oscillator situated to generate and direct the output beam away from the second optical fiber and (ii) an optical power sensitive component that is optically coupled to a core of the laser oscillator so as to copropagate with the output beam.

16. The method of claim 15, wherein the power sensitive laser system (Original) components include at least one of a fused fiber combiner or a pump module.

17. A method, comprising:
situating in a fiber laser system configured to produce a signal beam at a signal wavelength a fiber Bragg grating (FBG) configured to be reflective at a stimulated Raman scattering (SRS) wavelength of the signal wavelength so that an SRS beam that propagates in a fiber core of the fiber laser system is reflected so as to propagate back along the fiber core and away from power sensitive laser system components of the fiber laser system so as to reduce a damage associated with receiving of the SRS beam by the power sensitive laser system components,
wherein the fiber laser system comprises an optical fiber having a core, the optical fiber comprising a first optical fiber coupled to a second optical fiber to produce an output beam, and
wherein the second optical fiber comprises a length of optical fiber that is situated between (i) a high reflector of the fiber laser oscillator situated to generate and direct the output beam away from the second optical fiber and (ii) an optical power sensitive component that is optically coupled to a core of the laser oscillator so as to copropagate with the output beam.

18. The method of claim 17, wherein the power sensitive laser system components include one or more of a fused fiber combiner or one or more pump modules.

* * * * *